United States Patent [19]

Pinkhasov

[11] Patent Number: 4,828,934

[45] Date of Patent: May 9, 1989

[54] METHOD OF PROTECTING CERAMIC BODIES AGAINST MECHANICAL AND THERMAL ACTION

[75] Inventor: Eduard Pinkhasov, Eastchester, N.Y.

[73] Assignee: Vapor Technologies, Inc., Mount Vernon, N.Y.

[21] Appl. No.: 941,185

[22] Filed: Dec. 12, 1986

[51] Int. Cl.⁴ .................. B32B 15/04; B32B 9/00; C25D 11/02; B05D 3/06
[52] U.S. Cl. .................. 428/622; 428/627; 428/629; 428/689; 428/698; 427/37; 427/419.2; 427/404
[58] Field of Search ............ 427/37, 419.7, 419.2, 427/404; 51/295, 307, 309; 428/908.8, 472, 698, 622, 623, 627, 628, 629, 661, 663, 664, 665, 666, 667

[56] References Cited

U.S. PATENT DOCUMENTS

| | | | |
|---|---|---|---|
| 4,461,799 | 7/1984 | Gavrilov et al. | 428/210 |
| 4,532,190 | 7/1985 | Kanbe et al. | 428/627 |
| 4,537,794 | 8/1985 | Pinkhasov | 427/37 |
| 4,563,407 | 1/1986 | Matsui et al. | 428/664 |
| 4,567,110 | 1/1986 | Jarvinen | 428/433 |

Primary Examiner—Shrive Beck
Assistant Examiner—M. A. Bueker
Attorney, Agent, or Firm—Herbert Dubno

[57] ABSTRACT

Ceramic substrates, e.g. of silicon carbide or silicon nitride are protected against mechanical surface wear at high temperatures by an arc coating with a refractory metal followed by coating with another metal and then with a wear-reducing high density layer, e.g. of a metal oxide, nitride or carbide.

15 Claims, 1 Drawing Sheet

METHOD OF PROTECTING CERAMIC BODIES AGAINST MECHANICAL AND THERMAL ACTION

FIELD OF THE INVENTION

My present invention relates to method of protecting ceramic bodies against mechanical and thermal action, i.e. against wear in high temperature applications. The invention also relates to ceramic bodies having improved protective coatings.

BACKGROUND OF THE INVENTION

In my below-listed U.S. Pat. Nos:

| U.S. PAT. NO. | TITLE OF PATENT | ISSUE DATE |
|---|---|---|
| 4,351,855 | NONCRUCIBLE METHOD OF AND APPARATUS FOR THE VAPOR DEPOSITION OF MATERIAL UPON A SUBSTRATE USING VOLTAIC ARC IN VACUUM | 09/28/82 |
| 4,438,153 | METHOD OF AND APPARATUS FOR THE VAPOR DEPOSITION OF A MATERIAL UPON A SUBSTRATE | 03/20/84 |
| 4,537,794 | METHOD OF COATING CERAMICS | 08/27/85 |
| 4,505,948 | METHOD OF COATING CERAMICS AND QUARTZ CRUCIBLES WITH MATERIAL ELECTRICALLY TRANSFORMED INTO A VAPOR PHASE | 03/19/85 |
| 4,548,670 | SILICON MELTING AND EVAPORATION METHOD FOR HIGH PURITY APPLICATIONS | 10/22/85 |
| 4,565,711 | METHOD OF AND APPARATUS FOR THE COATING OF QUARTZ CRUCIBLES WITH PROTECTIVE LAYERS | 01/21/86 |
| 4,569,307 | SILICON MELTING AND EVAPORATING APPARATUS FOR HIGH PURITY APPLICATIONS | 02/22/86 |
| 4,596,719 | MULTILAYER COATING METHOD AND APPARATUS | 06/24/86 |
| 4,609,564 | METHOD OF AND APPARATUS FOR THE COATING OF A SUBSTRATE WITH MATERIAL ELECTRICALLY TRANSFORMED INTO A VAPOR PHASE. | 09/02/86 |

I have described a unique method of coating substrates which involves the striking of an electric arc utilizing, as one of the electrodes for the arc, a material of a substance to be coated onto a substrate.

Among these patents, moreover, is U.S. Pat. No. 4,537,794 which describes a method of coating ceramics, primarily to promote the adhesion of conductive layers thereto, whereby refractory metal layers are first applied to the ceramic substrate, e.g. by a process using a low voltage arc and at comparatively low temperatures in a vacuum, whereupon the conductive metal layer is applied, e.g. in a like manner.

While the resulting coatings are highly adherent, they have only limited wear resistance.

In recent years, the use of ceramic materials, such as clay-based ceramics as well as oxide ceramics, cermets, silicon nitride and silicon carbide ceramics have been found to be increasingly of interest in mechanical systems where wear at high temperatures may be a problem.

It has been suggested, for example in the case of silicon nitride where contact pressure can cause deterioration of a wear surface, that coatings may be provided to limit the damage of such surfaces, and indeed, plasma-coating systems and like spray deposition techniques have been used for such coating purposes. However, the resulting products have not been fully satisfactory.

OBJECTS OF THE INVENTION

It is, therefore, the principal object of the present invention to provide an improved method of protecting ceramic bodies against mechanical and thermal effects, especially wear at high temperatures whereby the drawbacks of earlier systems are avoided.

Another object of this invention is to provide a method of coating ceramics which allows a significant improvement in the protection of ceramic surfaces by the application of coatings with a high degree of adhesion which are capable of reducing wear and thermal effects.

SUMMARY OF THE INVENTION

I have now found that the arc deposition technique described in the aforementioned patents can be used most effectively for the mechanical and thermal protection of ceramic surfaces by the application of a high-density low-permeability coating of the ceramic which can be made highly adherent to the ceramic through the use of at least one and preferably two intermediate layers including a layer consisting of or containing a refractory metal.

More particularly, I have now found that when, a ceramic substrate, composed for example, of silicon carbide or silicon nitride and which may be sensitive to mechanical stress by wear action is coated initially with a layer containing a refractory metal, e.g. titanium but also a compound of titanium such as titanium nitride, or some other refractory compound, e.g. tungsten carbide, the desired protective effect can be achieved because especially high-density low-permeability coatings can be formed.

Most advantageously, the refractory metal coating is, in turn, provided with a coating of at least one other metal, e.g. chromium, to which is applied the high-density outer coating. While best results are obtained with such high-density outer coatings as chromium oxide ($Cr_2O_3$), zirconium oxide ($ZrO_2$), yttrium oxide ($Y_2O_3$) and mixtures thereof or mixtures thereof with calcium oxide, the outer layer can consist of or contain such other protective materials as titanium nitride, tungsten carbide, aluminum oxide and aluminum nitride.

The substrate can be silicon carbide or silicon nitride as previously noted.

According to an important feature of the invention, at least one of the layers and preferably all of the layers are formed by striking a low voltage arc between two electrodes at least one of which consists of a material which is present in the respective layer or constitutes that layer. In the case of the outer layer, which is always a compound, in accordance with the invention, when the compound is an oxide, oxygen is introduced into the vacuum chamber in which the vacuum can be drawn to a level of $10^{-5}$ torr or deeper.

It is indeed surprising that the oxide coatings which form the final layer, when applied by the arc-deposition technique of the instant invention, are far more dense and less permeable to gases than the plasma coatings which have hitherto been proposed as protections for ceramic bodies.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
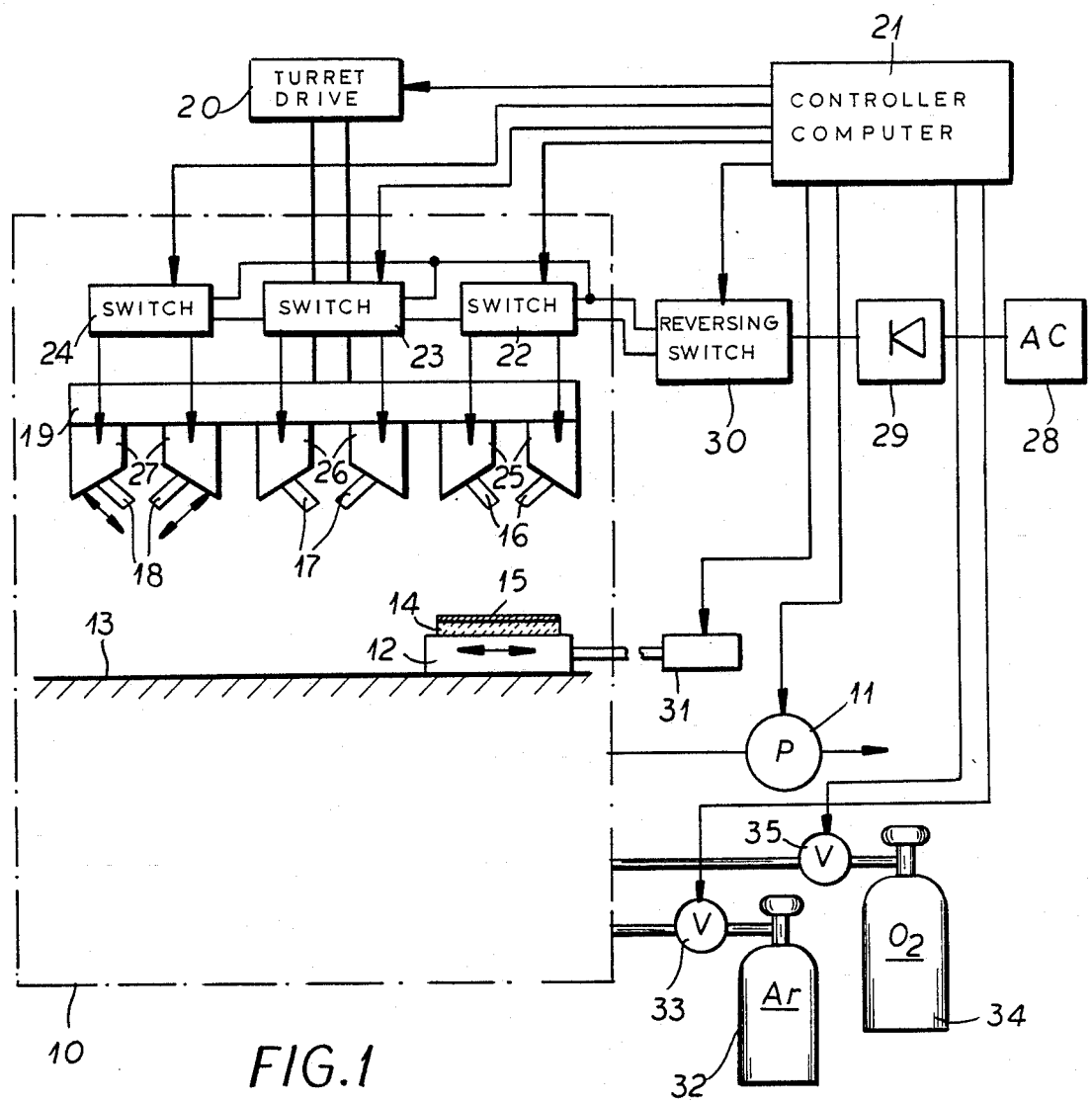
FIG. 1 is a diagram of an apparatus for carrying out the method of the invention.

In FIG. 1 of the drawing, I have shown an apparatus, in a highly diagrammatic form, for carrying out the method of the invention. This apparatus is generally similar to those described in my prior patents and comprises a chamber 10 which can be evacuated by a suction pump 11 to the desired degree of vacuum, generally $10^{-5}$ to $10^{-6}$ torr.

Within this chamber, a carriage 12 may be displaceable on a support 13 to position a ceramic substrate 14 so that its surface 15 can receive a coating from a selected pair of electrodes 16, 17 or 18 which can be brought into play in succession, e.g. by rotation of a turntable 19 carrying these electrodes.

The turntable 19 may be driven by a turret drive 20 under the control of a computer 21 which also controls the energization of the selected pair of electrodes 16, 17, 18 via respective switches 22, 23 and 24 which can be gated by a computer.

Each of the pairs of electrodes 16, 17, 18 can, in turn, be provided with respective reciprocating drives 25, 26 and 27 such as the electromagnetic motors or solenoids mentioned in U.S. Pat. No. 4,537,794 for briefly bringing the electrodes into contact to strike the arc and then drawing them apart.

Such means have been described in others of the patents mentioned previously which are hereby incorporated by reference insofar as they describe striking of the arc and the means for reciprocating electrodes to strike the arc can be periodically energized by pulsers (not shown) as is also described in U.S. Pat. No. 4,537,794.

The power supply for the electrodes can comprise an alternating current source 28 which is connected to a rectifier 29 and a reversing switch 30 between the rectifier and the electrode-selection switches 22-24. The reversing switch can reverse the polarity of the electrodes of each pair, if desired, in the manner and for the reasons described in the last-mentioned U.S. Pat. No.

The apparatus also comprises, under the control of the computer 21, an actuator 31 for shifting the substrate 14 on the carriage 12 as may be required within the vacuum chamber, a source 32 of an inert (nonreactive) gas such as argon connected by a valve 33 to the vacuum chamber to permit flushing of the latter, and a source 32 of a reactive gas which is oxygen in the embodiment shown and is connected by a valve 35 to the vacuum chamber.

Figure 2:
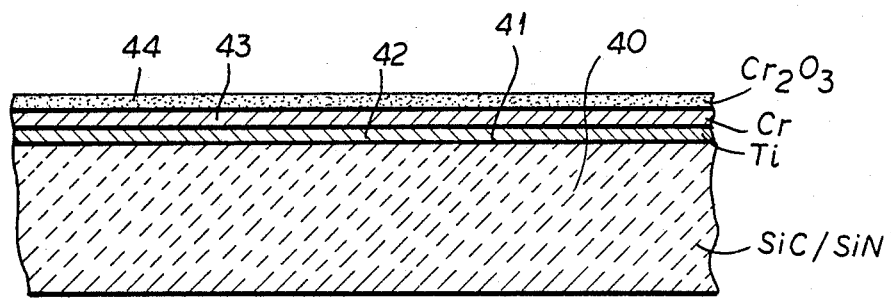
FIG. 2 is a cross sectional view drawn to a much larger scale illustrating a coated product.

In FIG. 2 I have shown, also in highly diagrammatic form, an article made by the method of the invention.

That article can include a silicon carbide or silicon nitride substrate 40 whose surface 41 after cleaning and etching, if desired, is provided with a thin coating 42 of a refractory metal, e.g. titanium, or a number of layers of a refractory metal or group of refractory metals. If desired, one of the refractory layers can be, for example, titanium nitride, as formed by admitting nitrogen as a reactive gas, into the chamber 10 while an arc is struck with titanium electrodes therein.

Upon this refractory layer, another metal, e.g. chromium, may be deposited in at least one further layer 43 and on this layer the final layer 44, e.g. of chromium oxide, zirconium oxide or a combination thereof or a combination of either of them with yttrium oxide, may be formed at 44.

This last layer has especially high density and low permeability to gases and in combination with the refractory and other metal layer, can provide especially high adhesion to the aforementioned ceramic substrates to limit surface wear and deterioration of the ceramic body even with high mechanical stresses and at high temperatures.

The coated ceramic bodies which are thus produced, can be readily employed in engine applications in which ceramics have encountered difficulty heretofore.

In operation, the substrate 14 is introduced into the chamber and is juxtaposed with a first pair of electrodes 16, e.g. titanium electrodes, after the surface 15 has been degreased and electrically or chemically or plasma etched.

An electric arc is struck between the titanium electrodes after a vacuum of $10^{-6}$ torr has been drawn and the substrate can be moved back and forth via the drive 31 as controlled by the computer until a refractory metal coating thickness of 5 to 10 microns has been applied.

The turret is then rotated to bring a second pair of electrodes 17 into position under the control of the computer 21 and an arc is struck between these chromium electrodes while a vacuum at least as deep as $10^{-5}$ torr is maintained. The chromium coating may be built up to a thickness of say 10 to 20 microns. Thereupon the chromium arc is maintained while oxygen is bled from the tank 34 into the chamber which originally was flushed with argon to remove all traces of air. The oxygen reacts with the chromium vapor generated by the chromium electrode arc and deposits a layer of $Cr_2O_3$ on the chromium metal layer to a thickness which may be of the order of 25 to 30 microns.

If desired, while a deep vacuum is maintained and oxygen continues to pass into the chamber, the turret 19 can be rotated again under the control of the computer to bring the electrodes 18 into operation. One of the electrodes 18 may be a zirconium electrode while the other is an alloy of zirconium and yttrium so that the arc struck between these two electrodes, with polarity alteration from time to time will deposit a coating consisting of 75% zirconium oxide $ZrO_2$ and 25% yttrium oxide $Y_2O_3$ on the previously deposited chromium oxide coating.

Micrograph studies of the high density coatings applied in accordance with the invention show significant interdiffusion among the layers and between the coating layers and the substrate, this interdiffusion being believed to account for the high adhesion of the coatings.

SPECIFIC EXAMPLE

Using the technique described, a silicon carbide substrate is coated with an arc current of 70 amperes and a voltage of 80 volts to a thickness of 10 microns with titanium, a coating of 15 microns thickness with chromium and a coating of 25 microns thickness with chromium oxide and then with a coating of 10 microns thickness with a mixture of 75% zirconium oxide and 25% yttrium oxide.

The resulting coatings are found to be extremely dense and of high adhesion to the substrate and to be capable of protecting the otherwise sensitive silicon carbide surface from mechanical wear at high temperatures.

I claim:

1. A method of protecting a ceramic body against mechanical and thermal deterioration, comprising the steps of:

applying to a surface of said ceramic body, formed as a substrate, a thin layer of a refractory metal;

thereafter depositing upon said refractory metal a layer of another metal; and depositing upon said layer of said other metal a high-density substantially impermeable layer of at least one protective compound selected from the group which consists of chromium oxide, zirconium oxide, titanium nitride, tungsten carbide, aluminum oxide, yttrium oxide and aluminum nitride, at least one of said layers being applied by juxtaposing said substrate in an evacuated chamber with a pair of electrodes, at least one of which is composed of a material adapted to form the respective layer, and striking an arc between said electrodes to deposit said material on said substrate to form the respective layer.

2. The method defined in claim 1 wherein each of said layers is applied by juxtaposing said substrate in an evacuated chamber with a pair of electrodes, at least one of which is composed of a material adapted to form the respective layer, and striking an arc between said electrodes to deposit said material on said substrate to form the respective layer.

3. The method defined in claim 2 wherein said layers are deposited in succession on said substrate without removing said substrate from said chamber.

4. A method of protecting a ceramic body against mechanical and thermal deterioration, comprising the steps of:

applying to a surface of said ceramic body, formed as a substrate, a thin layer of a refractory metal;

thereafter depositing upon said refractory metal a layer of another metal; and depositing upon said layer of said other metal a high-density substantially impermeable layer of at least one protective compound selected from the group which consists of chromium oxide, zirconium oxide, titanium nitride, tungsten carbide, aluminum oxide, yttrium oxide and aluminum nitride, at least one of said layers being applied by juxtaposing said substrate in an evacuated chamber with a pair of electrodes, at least one of which is composed of a material adapted to form the respective layer, and striking an arc between said electrodes to deposit said material on said substrate to form the respective layer, said layers being deposited in succession on said substrate without removing said substrate from said chamber, said high-density substantially impermeable layer being composed of $Cr_2O_3$, $ZrO_2$, $Y_2O_3$ or mixtures thereof, during the deposition of said high-density substantially impermeable layer an arc being struck between two electrodes at least one of which consists of chromium, zirconium or yttrium while oxygen is admitted to said chamber.

5. A method of protecting a ceramic body against mechanical and thermal deterioration, comprising the steps of:

applying to a surface of said ceramic body, formed as a substrate, a thin layer of a refractory metal;

thereafter depositing upon said refractory metal a layer of another metal; and depositing upon said layer of said other metal a high-density substantially impermeable layer of at least one protective compound, at least one of said layers being applied by juxtaposing said substrate in an evacuated chamber with a pair of electrodes, at least one of which is composed of a material adapted to form the respective layer, and striking an arc between said electrodes to deposit said material on said substrate to form the respective layer, each of said layers being applied by juxtaposing said substrate in an evacuated chamber with a pair of electrodes, at least one of which is composed of a material adapted to form the respective layer, and striking an arc between said electrodes to deposit said material on said substrate to form the respective layer.

6. The method defined in claim 5 wherein said layers are deposited in succession on said substrate without removing said substrate from said chamber.

7. A method of protecting a ceramic body against mechanical and thermal deterioration, comprising the steps of:

applying to a surface of said ceramic body, formed as a substrate, a thin layer of a refractory metal;

thereafter depositing upon said refractory metal a layer of another metal; and depositing upon said layer of said other metal a high-density substantially impermeable layer of at least one protective compound, at least one of said layers being applied by juxtaposing said substrate in an evacuated chamber with a pair of electrodes, at least one of which is composed of a material adapted to form the respective layer, and striking an arc between said electrodes to deposit said material on said substrate to form the respective layer, said layers being deposited in succession on said substrate without removing said substrate from said chamber, said high-density substantially impermeable layer being composed of $Cr_2O_3$, $ZrO_2$, $Y_2O_3$ or mixtures thereof and during the deposition of said high-density substantially impermeable layer an arc being struck between two electrodes at least one of which consists of chromium, zirconium or yttrium while oxygen is admitted to said chamber.

8. A method of protecting a ceramic body against mechanical and thermal deterioration, comprising the steps of:
applying to a surface of said ceramic body, formed as a substrate, a thin layer of a refractory metal;
thereafter depositing upon said refractory metal a layer of another metal; and
depositing upon said layer of said other metal a high-density substantially impermeable layer of at least one protective compound, at least one of said layers being applied by juxtaposing said substrate in an evacuated chamber with a pair of electrodes, at least one of which is composed of a material adapted to form the respective layer, and striking an arc between said electrodes to deposit said material on said substrate to form the respective layer, each of said layers being applied by juxtaposing said substrate in an evacuated chamber with a pair of electrodes, at least one of which is composed of a material adapted to form the respective layer, and striking an arc between said electrodes to deposit said material on said substrate to form the respective layer, said layers being deposited in succession on said substrate without removing said substrate from said chamber, said high-density substantially impermeable layer is composed of $Cr_2O_3$, $ZrO_2$, $Y_2O_3$ or mixtures thereof and during the deposition of said high-density substantially impermeable layer an arc being struck between two electrodes at least one of which consists of chromium, zirconium or yttrium while oxygen is admitted to said chamber, said substrate being composed of silicon carbide or nitride.

9. The method defined in claim 8 wherein said refractory metal is titanium or tungsten.

10. The method defined in claim 9 wherein said other metal is chromium.

11. A ceramic body protected against mechanical and thermal deterioration by a refractory metal layer bonded directly to said body, a layer of another metal on said refractory metal layer and a high-density substantially impermeable layer of at least one protective compound, on said layer of said other metal, said refractory metal layer being titanium or tungsten and being applied in a thickness of 5 to 10 microns to a silicon carbide or nitride substrate, said other metal is chromium and said high-density substantially impermeable layer is composed of $Cr_2O_3$, $ZrO_2$, $Y_2O_3$ or mixtures thereof.

12. A method of protecting a ceramic body against mechanical and thermal deterioration, comprising the steps of:
applying to a surface of said ceramic body, formed as a substrate composed of silicon carbide or silicon nitride, a thin layer of a refractory metal;
thereafter depositing upon said refractory metal a layer of another metal; and
depositing upon said layer of said other metal a high-density substantially impermeable layer, each one of said layers being applied by juxtaposing said substrate in an evacuated chamber with a pair of electrodes, at least one of which is composed of a material adapted to form the respective layer, and striking an arc between said electrodes to deposit said material on said substrate to form the respective layer.

13. The method defined in claim 12 wherein said refractory metal is titanium or tungsten.

14. The method defined in claim 13 wherein said other metal is chromium.

15. A method of protecting a ceramic body against mechanical and thermal deterioration, comprising the steps of:
applying to a surface of said ceramic body, formed as a substrate composed of silicon carbide or silicon nitride, a thin layer of a refractory metal;
thereafter depositing upon said refractory metal a layer of another metal; and
depositing upon said layer of said other metal a high-density substantially impermeable layer said refractory metal being titanium or tungsten said other metal being chromium, and said high-density substantially impermeable layer being composed of $Cr_2O_3$, $ZrO_2$, $Y_2O_3$ or mixtures thereof.

* * * * *